US008368419B2

United States Patent
Su

(10) Patent No.: US 8,368,419 B2
(45) Date of Patent: Feb. 5, 2013

(54) ASSESSMENT OF ON-CHIP CIRCUIT BASED ON EYE-PATTERN ASYMMETRY

(75) Inventor: Jianghui Su, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 375 days.

(21) Appl. No.: 12/848,836

(22) Filed: Aug. 2, 2010

(65) Prior Publication Data

US 2012/0025889 A1    Feb. 2, 2012

(51) Int. Cl.
*G01R 31/02*    (2006.01)
(52) U.S. Cl. .................................. 324/762.01
(58) Field of Classification Search .. 324/762.01–762.1, 324/754.01–754.3, 755.01–755.1; 327/307, 327/306, 58, 63, 62; 257/48; 438/14–18
See application file for complete search history.

(56) References Cited

U.S. PATENT DOCUMENTS

| 6,525,522 B1 * | 2/2003 | Pickerd | 324/76.58 |
| 7,382,166 B1 * | 6/2008 | Ide | 327/62 |

* cited by examiner

*Primary Examiner* — Tung X Nguyen
(74) *Attorney, Agent, or Firm* — Park, Vaughan, Fleming & Dowler LLP; Steven E. Stupp

(57) ABSTRACT

During an asymmetry testing mode of an integrated circuit, the asymmetry of an on-chip I/O circuit is tested. In particular, a transmitter circuit in the integrated circuit transmits electrical signals, which are associated with a predefined data pattern, to a receiver circuit in the integrated circuit via a communication channel (such as a differential pair of signal lines). Then the integrated circuit generates an eye pattern using the received electrical signals, and determines an asymmetry of the eye pattern about a common reference level of the received electrical signals. Furthermore, the integrated circuit performs remedial action based on the determined asymmetry. For example, the integrated circuit may compare the determined asymmetry with a predefined asymmetry criterion and, if the asymmetry exceeds the predefined asymmetry criterion, may output a result of the comparison that indicates a failure of the asymmetry test.

20 Claims, 7 Drawing Sheets

ASSESSMENT OF ON-CHIP CIRCUIT BASED ON EYE-PATTERN ASYMMETRY

BACKGROUND

1. Field

The present disclosure generally relates to circuits. More specifically, the present disclosure relates to an integrated circuit that assesses an on-chip input/output (I/O) circuit based on an asymmetry of an eye pattern associated with the I/O circuit.

2. Related Art

The performance of high-performance input/output (I/O) circuits, such as high-speed serial links, is often dependent on the accuracy of the impedance matching and impedance balancing between the transmitter circuit, the receiver circuit and the communication channel that couples these components. For example, the impedance matching may include: the resistances of the termination resistors, trace resistances and connector contact resistances.

During manufacturing, deviations from the nominal values for these resistances can occur. For example, the traces and/or the connectors may inadvertently include resistance differences on differential signal lines, such as those associated with open, partially open, shorted or partially shorted components.

If any of the components in a high-performance I/O circuit deviates from the design or nominal values, the transfer function and, thus, the signal properties may be significantly changed. In turn, these changes may significantly degrade the margin of the I/O circuit, with a commensurate impact on performance, stability and reliability.

As a consequence, qualification testing is typically performed during or immediately after manufacturing to identify any deviations in the specified values of the components in high-speed I/O circuits. However, as circuits become increasingly complicated, testing is becoming more time consuming and expensive. Furthermore, proper testing of a high-performance I/O circuit is often not possible until this circuit is integrated into a larger system, which may occur long after the circuit is manufactured.

Hence, what is needed are an I/O circuit and an associated testing technique that do not suffer from the above-described problems.

SUMMARY

One embodiment of the present disclosure provides an integrated circuit that includes a transmitter circuit, a communication channel, a receiver circuit and control logic. The transmitter circuit transmits electrical signals associated with a data pattern via the communication channel to the receiver circuit, which receives the electrical signals. Moreover, the control logic controls entry to and exit from an asymmetry testing mode in which the data pattern includes a predefined data pattern. Furthermore, during the asymmetry testing mode, the control logic: generates an eye pattern based on the received electrical signals; determines an asymmetry of the eye pattern about a common reference level of the received electrical signals; and performs remedial action based on the determined asymmetry.

For example, performing the remedial action may involve: assessing the circuit by comparing the determined asymmetry with a predefined asymmetry criterion; and outputting a result of the assessment to an external device. Note that, if the asymmetry exceeds the predefined asymmetry criterion, the result may indicate that the circuit fails an asymmetry test. Alternatively or additionally, performing the remedial action may involve outputting a specifier for the determined asymmetry to the external device and/or outputting the generated eye pattern to the external device.

In some embodiments, the communication channel includes a differential pair of signal lines, the receiver circuit includes a differential receiver and the asymmetry is associated with termination impedances of the communication channel. Furthermore, the termination impedances may include a first termination impedance and a second termination impedance, which is in parallel with the first termination impedance. Additionally, the asymmetry may be associated with a difference between the first termination impedance and the second termination impedance.

Furthermore, the integrated circuit may include a multiplexer that selectively couples the control logic to the transmitter circuit and the receiver circuit. In some embodiments, the integrated circuit includes multiple instances of the transmitter circuit, the communication channel and the receiver circuit. In these embodiments, the control logic may: provide signals to the multiplexer to selectively couple the control logic to the multiple instances of the transmitter circuit and the receiver circuit; generate eye patterns based on received electrical signals from the multiple instances of the receiver circuit; determine asymmetries of the eye patterns about common reference levels of the associated received electrical signals; and perform the remedial action based on the determined asymmetries. Note that determining the asymmetries may involve statistical analysis of the eye patterns.

Another embodiment provides an electronic device that includes the integrated circuit.

Another embodiment provides a method for assessing an on-chip circuit during an asymmetry testing mode. During this method, a transmitter circuit in the circuit transmits electrical signals associated with a predefined data pattern. Then, a communication channel in the circuit conveys the electrical signals. Moreover, a receiver circuit in the circuit receives the electrical signals. Next, control logic in the circuit: generates an eye pattern based on the received electrical signals; determines an asymmetry of the eye pattern about a common reference level of the received electrical signals, and performs remedial action based on the determined asymmetry.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit, an electronic device that includes the integrated circuit, and a method for assessing an on-chip I/O circuit during an asymmetry testing mode are described. During the asymmetry testing mode, a transmitter circuit in the integrated circuit transmits electrical signals, which are associated with a predefined data pattern, to a receiver circuit in the integrated circuit via a communication channel (such as a differential pair of signal lines). Then, the integrated circuit generates an eye pattern using the received electrical signals, and determines an asymmetry of the eye pattern about a common reference level of the received electrical signals. Furthermore, the integrated circuit performs remedial action based on the determined asymmetry. For example, the integrated circuit may compare the determined asymmetry with a predefined asymmetry criterion and, if the asymmetry exceeds the predefined asymmetry criterion, may output a result of the comparison that indicates a failure of the asymmetry test.

By facilitating on-chip assessment of asymmetry (such as that associated with an imbalance in termination resistances), the integrated circuit may provide faster and more cost-effective testing of on-chip circuits. In turn, this capability may reduce the testing time and, thus, the cost of the integrated circuit. Furthermore, this testing approach may allow asymmetry testing without requiring the use of an external tester. Additionally, this testing approach may facilitate asymmetry testing of the integrated circuit after it has been integrated into a larger system, which may allow the asymmetry testing to include the impact of the system on the integrated circuit (such as the impact of connection resistances in the system), and thus may allow repair or replacement of defective components prior to shipment of the system. Therefore, the integrated circuit may solve the problems associated with testing integrated circuits for use in high-performance input/output (I/O) applications.

Figure 1A:
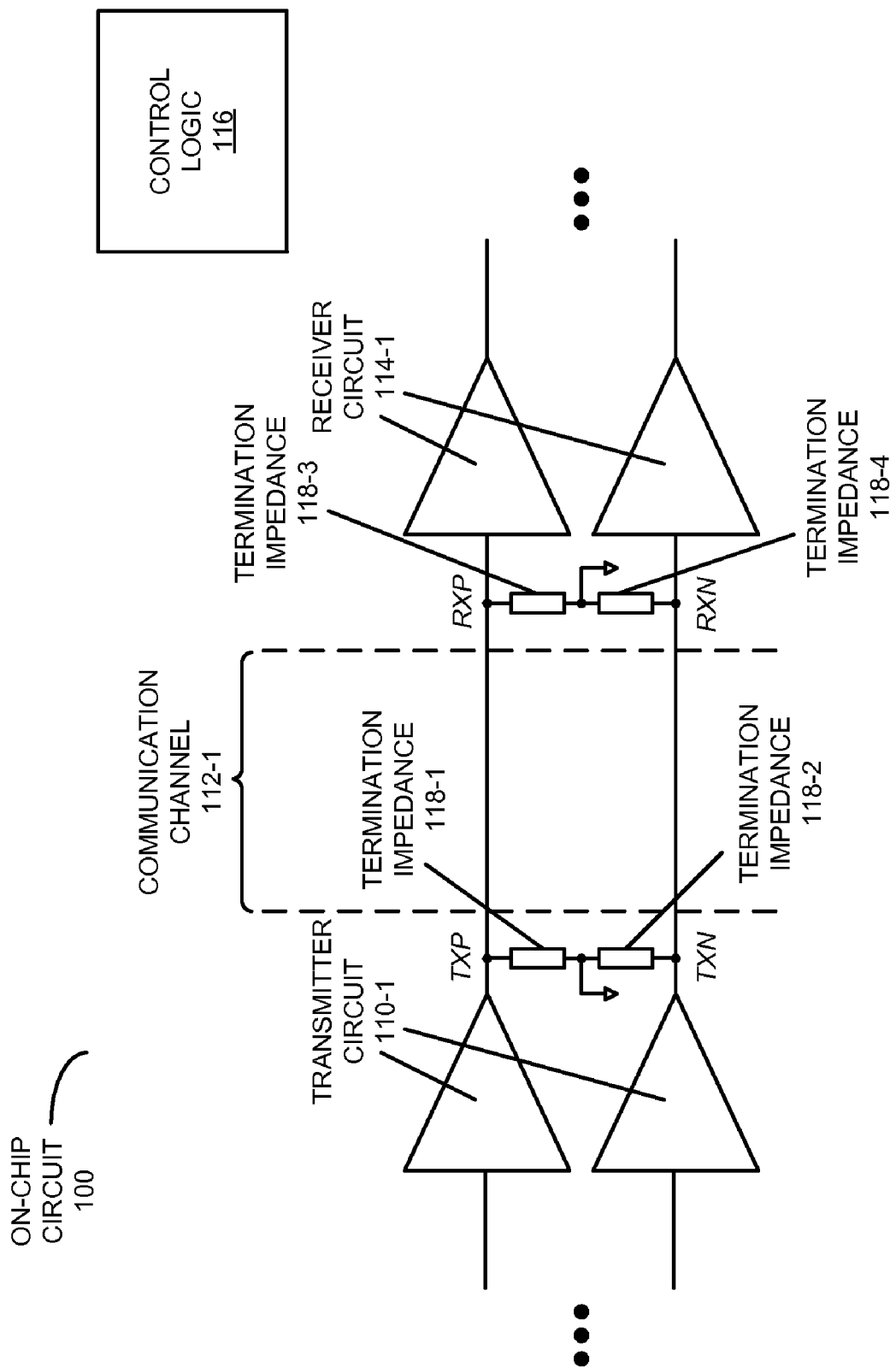
FIG. 1A is a block diagram illustrating an on-chip circuit in accordance with an embodiment of the present disclosure.

FIG. 1A presents a block diagram illustrating an on-chip circuit 100. This on-chip circuit includes: a transmitter circuit 110-1, a communication channel 112-1, a receiver circuit 114-1 and control logic 116. Transmitter circuit 110-1 transmits electrical signals associated with a data pattern via communication channel 112-1 to receiver circuit 114-1, which receives the electrical signals. Moreover, control logic 116 controls entry to and exit from an asymmetry testing mode (i.e., transitions to and from a normal operating mode) in which the data pattern includes a predefined data pattern (e.g., multiple sequential instances of a pseudorandom sequence or a clock pattern, such as a repeating '1010' pattern, a repeating '0011' pattern, and more generally, a pattern that includes data transitions and that is predictable or known at receiver 114-1). For example, control logic 116 may output a signal or an instruction that transitions on-chip circuit 100 to (or from) the asymmetry testing mode.

As described below with reference to FIGS. 2 and 3, during the asymmetry testing mode, control logic 116 generates an eye pattern based on the received electrical signals. This eye pattern can have one or more measured data points during each sample duration or unit interval (UI). Furthermore, control logic 116 determines an asymmetry of the eye pattern about a common reference level of the received electrical signals (or, more generally, a reference signal, such as ground or a zero-crossing level), and performs remedial action based on the determined asymmetry. For example, performing the remedial action may involve assessing on-chip circuit 100 by comparing the determined asymmetry with a predefined asymmetry criterion (such as an asymmetry of 50%), and outputting a result of the assessment to an external device (such as a tester, which may have a lower communication data rate than that associated with the electrical signals). Note that, if the asymmetry exceeds the predefined asymmetry criterion (which may correspond to an amplitude or an asymmetry margin in the design), the result may indicate that on-chip circuit 100 fails an asymmetry test. Alternatively or additionally, performing the remedial action may involve outputting a specifier for the determined asymmetry (such as a code corresponding to the determined asymmetry) to the external device and/or outputting the generated eye pattern to the external device (which may allow the external device to perform the assessment and/or to compile test results).

Note that, in order to facilitate on-chip generation of the eye pattern, components in on-chip circuit 100, such as receiver circuit 114-1, may sense or 'read' amplitude values for the received electrical signals. For example, receiver circuit 114-1 may include a threshold detector or an analog-to-digital converter that samples the received electrical signals and scans the magnitude out to control logic 116, which can use this information to construct the range of the received electrical signals (and thus the asymmetry). Alternatively, the received electrical signals may be compared to predefined positive and negative values. By monitoring the range on the positive and the negative side, control logic 116 can determine the range of the output from receiver 114-1. In some embodiments, the predefined positive and negative values are programmable, which may allow additional details of the range of the output from receiver 114-1 to be obtained.

As shown in FIG. 1A, in an exemplary embodiment communication channel 112-1 includes a differential pair of signal lines (such as a high-speed serial link, in which TXP and TXN are complements of each other), receiver circuit 114-1 includes a differential receiver and the asymmetry is associated with termination impedances 118 of communication channel 112-1 (such as impedances associated with termination resistors). (However, in other embodiments, the asymmetry is associated with the resistance of traces and/or connector contact resistances, such as in electronic device 600 in FIG. 6.) In particular, termination impedances 118 may include termination impedance 118-1 and termination impedance 118-2, which is in parallel with termination impedance 118-1. In this example, the asymmetry may be associated with a difference between termination impedance 118-1 and termination impedance 118-2. For example, if termination impedances 118 are resistances associated with resistors, and one of these resistances deviates by 50-100% from a specified value (such as 120Ω instead of 60Ω), the asymmetry of the eye pattern may be more than 50%, which may be sufficient to cause a failure during normal operation of on-chip circuit 100. Note that the difference in the resistance may occur during manufacturing of on-chip circuit 100.

Figure 1B:
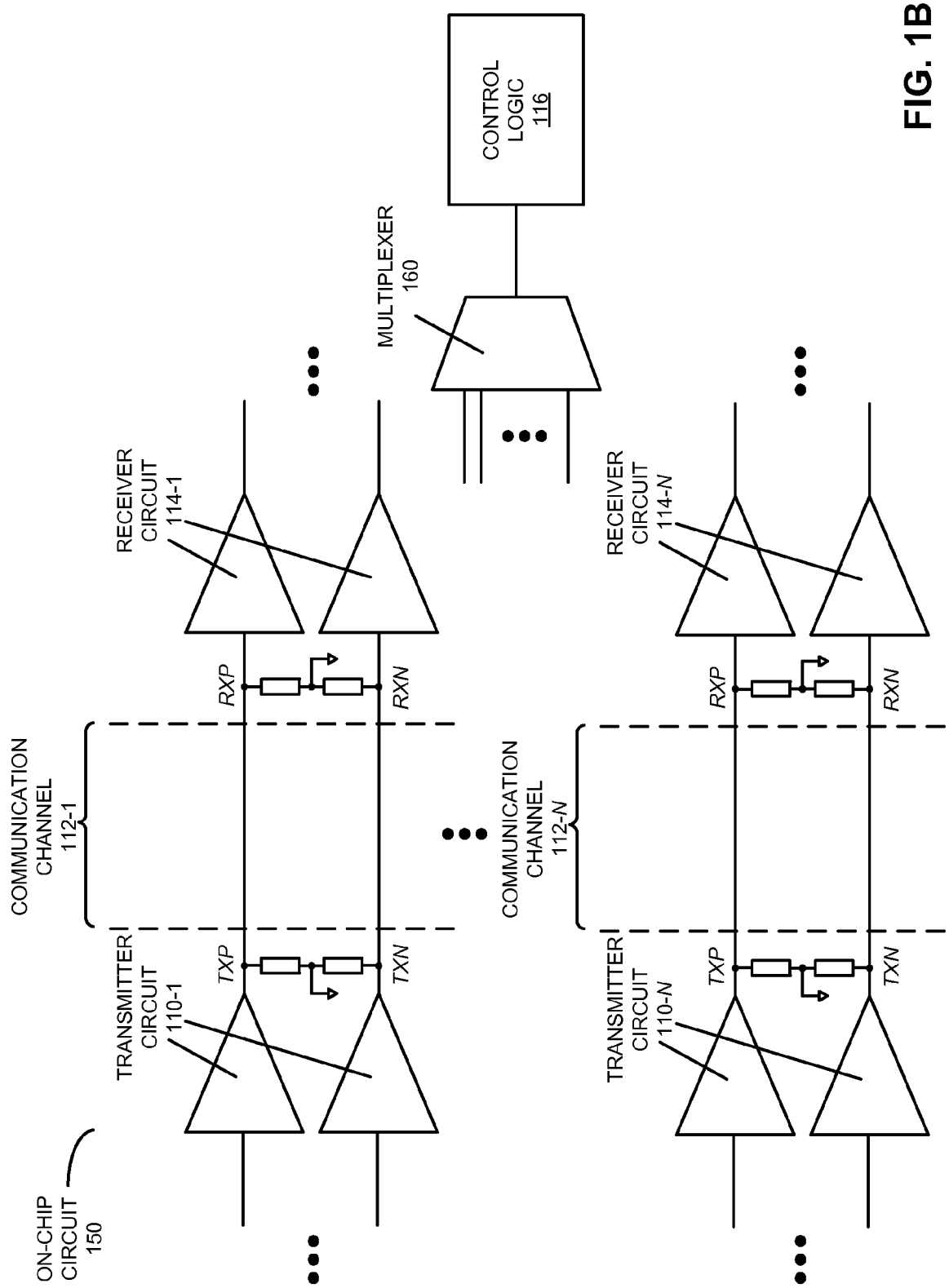
FIG. 1B is a block diagram illustrating an on-chip circuit in accordance with an embodiment of the present disclosure.

In some embodiments, there are multiple instances of a transmitter circuit, a communication channel and a receiver circuit in the on-chip circuit, and control logic 116 can be used to assess the asymmetry of any of these instances during the asymmetry testing mode. This is shown in FIG. 1B, which presents a block diagram illustrating an on-chip circuit 150. In this on-chip circuit, control logic 116 outputs signals to multiplexer 160, which then selectively couples control logic 116 to a transmitter circuit and/or a receiver circuit in one of these instances (such as transmitter circuit 110-1 and receiver circuit 114-1), thereby allowing the asymmetry to be determined.

In some embodiments, control logic 116 generates eye patterns and determines associated asymmetries about the common reference levels of the received electrical signals for multiple or all of the instances of the transmitter circuit, the communication channel and the receiver circuit in on-chip circuit 150. For example, control logic 116 may be selectively coupled to these instances sequentially or in parallel during the asymmetry testing mode.

Furthermore, control logic 116 may perform the remedial action based on one or more of the determined asymmetries. For example, the remedial action may be based on a peak or extremum asymmetry in a set of asymmetries that were determined for the different instances of the transmitter circuit, the communication channel and the receiver circuit. Alternatively, statistical analysis may be performed on the set of asymmetries of the eye patterns. Thus, the remedial action may be based on: the mean or average asymmetry of the eye patterns, a standard deviation of the asymmetries and/or a number of eye patterns that have asymmetries greater than the predefined asymmetry criterion.

In an exemplary embodiment, the on-chip circuit is a complementary metal-oxide semiconductor integrated circuit that includes hundreds of instances of the transmitter circuit, the communication channel and the receiver circuit. Consequently, it may not be possible to perform the asymmetry test on these instances using an external tester in a time-efficient and cost-effective manner.

Figure 2:
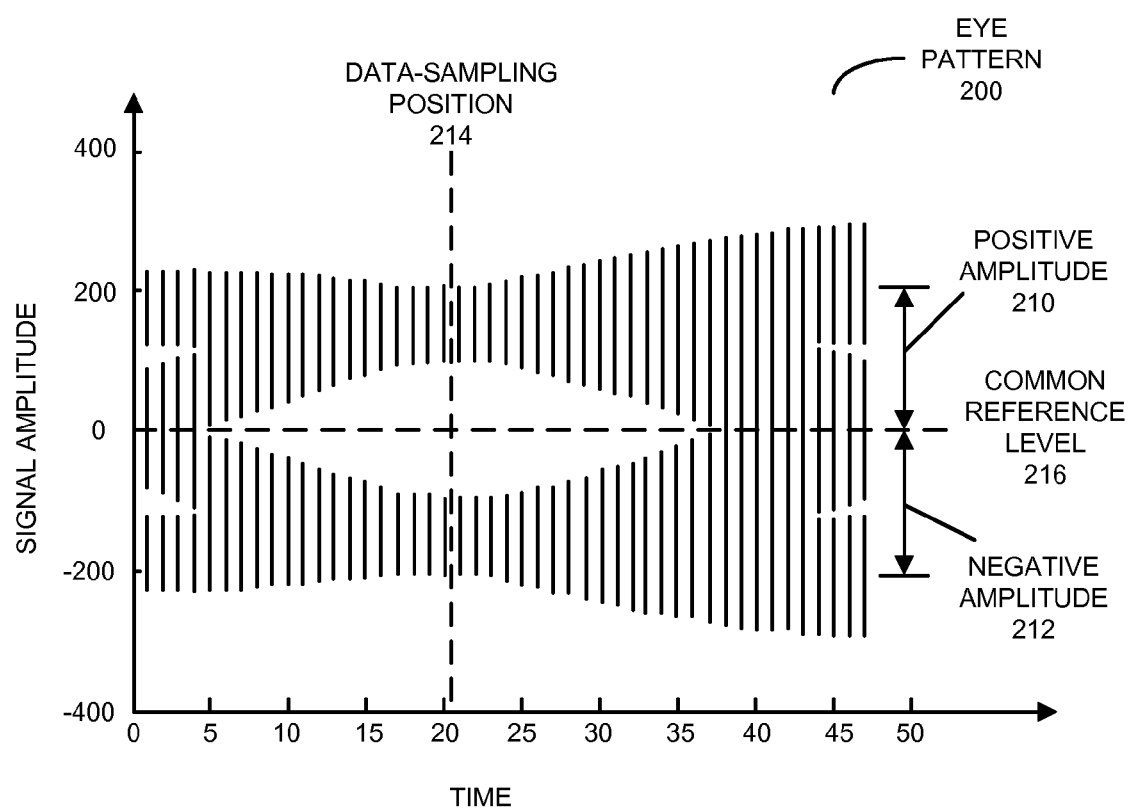
FIG. 2 is a block diagram illustrating an eye pattern determined from received electrical signals in the on-chip circuit of FIG. 1A or 1B in accordance with an embodiment of the present disclosure.
Figure 3:
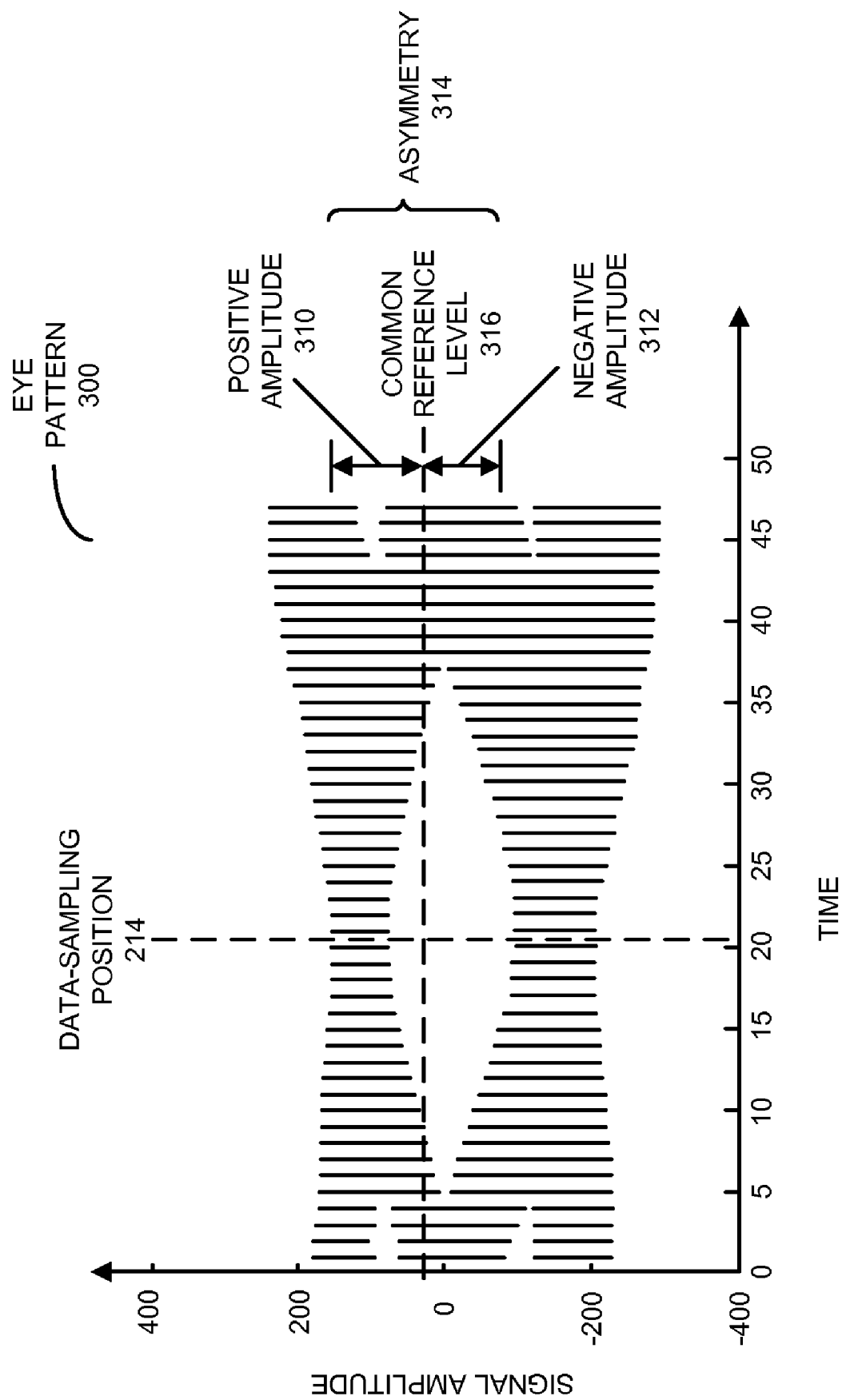
FIG. 3 is a block diagram illustrating an eye pattern determined from received electrical signals in the on-chip circuit of FIG. 1A or 1B in accordance with an embodiment of the present disclosure.

FIG. 2 presents a block diagram illustrating an eye pattern 200 determined from received electrical signals in on-chip circuit 100 (FIG. 1A) or on-chip circuit 150 (FIG. 1B). In this example, the received electrical signals output by one of receivers 114 (FIG. 1A or 1B), such as a differential amplifier, have a range from Vr to −Vr if the resistance of both positive and negative path resistances of a corresponding one of communication channels 112 in FIG. 1A or 1B match (including an open or a short in the positive and negative traces). Thus, in this example, eye pattern 200 has zero asymmetry (i.e., positive amplitude 210 and negative amplitude 212 at data-sampling position 214 are symmetric about common reference level 216) and, thus, presumably would pass the asymmetry test. Note that in embodiments where the communication channel includes a differential pair of signal lines, common reference level 216 may be a common mode of the received electrical signals.

However, in the presence of asymmetry, the eye pattern will be modified. This is shown in FIG. 3, which presents a block diagram illustrating an eye pattern 300 determined from received electrical signals in on-chip circuit 100 (FIG. 1A) or on-chip circuit 150 (FIG. 1B). In this example, eye pattern 300 has a finite asymmetry 314. This asymmetry may occur if the positive path and negative path resistances in one of communication channels 112 (FIG. 1A or 1B) don't match, such that the received electrical signals at the output of a corresponding one of receivers 114 in FIG. 1A or 1B, e.g., a differential receiver, have different positive and negative ranges (i.e., there is bias in one direction) relative to common reference level 316. Note that asymmetry 314 may be determined or calculated as the difference in positive amplitude 310 (which is also referred to as a positive eye-opening reference level) and negative amplitude 312 (which is also referred to as a negative eye-opening reference level) at data-sampling position 214 of eye pattern 300 divided by the average amplitude or the sum of positive amplitude 310 and negative amplitude 312.

Figure 4:
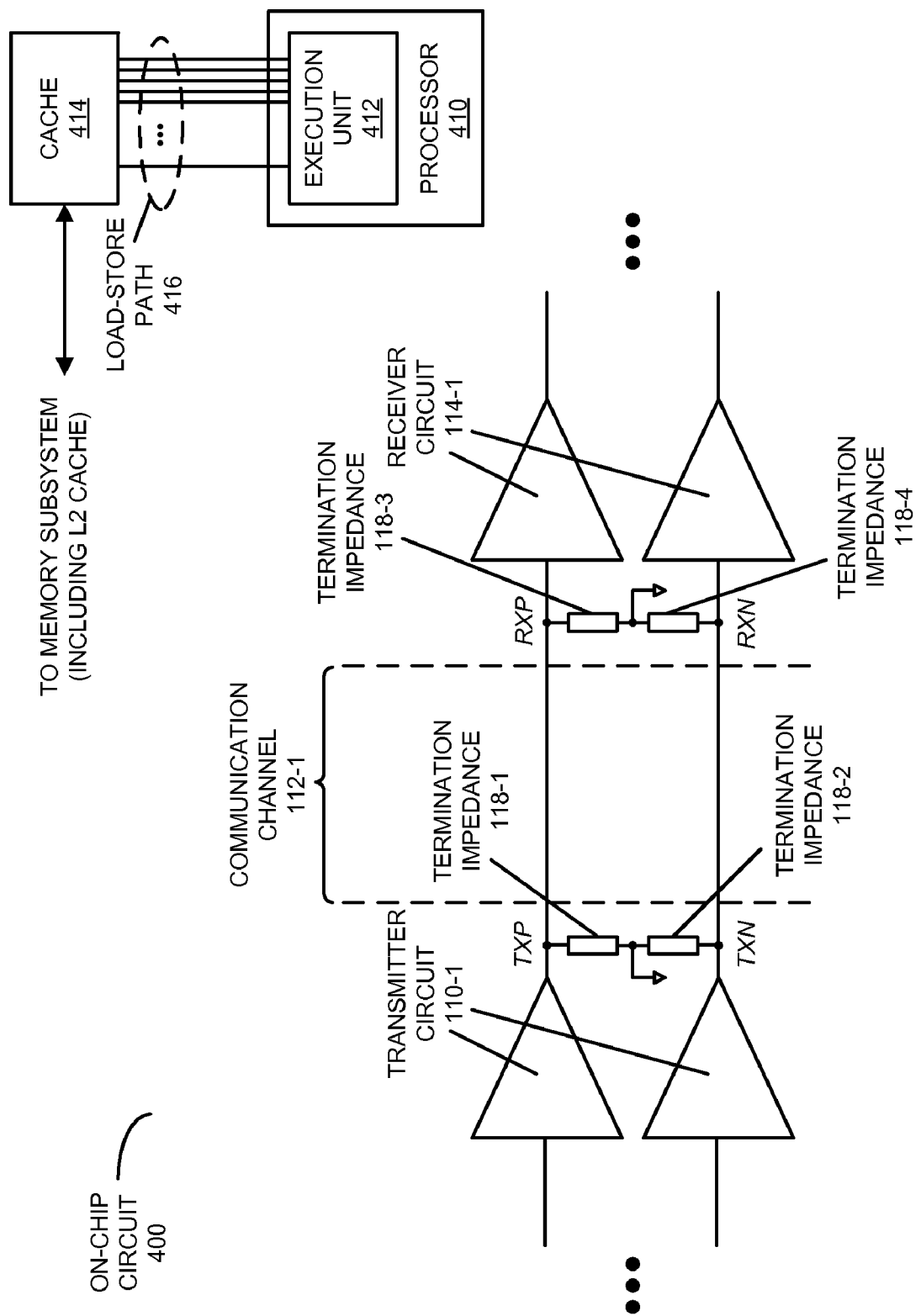
FIG. 4 is a block diagram illustrating an on-chip circuit in accordance with an embodiment of the present disclosure.

While the preceding embodiments illustrated hardware implementations of the on-chip circuit, in other embodiments the testing technique is implemented using hardware and/or software (thus, control logic 116 in FIGS. 1A and 1B should be understood to encompass hardware and/or software implementations). For example, functions of control logic 116 (FIGS. 1A and 1B) may be implemented using one or more processors (or processor cores) that execute instructions. This is illustrated in FIG. 4, which presents a block diagram illustrating on-chip circuit 400. In this on-chip circuit 400, an execution unit 412 in processor 410 executes operations in the asymmetry testing technique (such as controlling the asymmetry testing mode, generating the eye pattern based on the received electrical signals, determining the asymmetry of the eye pattern, performing the remedial action, etc.) that are specified by instructions stored in memory. Note that memory may include cache memory 414 (which is accessed via a load-store path 416). This memory may be coupled to a memory subsystem (not shown). Furthermore, cache memory 414 may include: a level-one (L1) data cache which communicates with a memory subsystem that includes a level-two (L2) unified instruction/data cache and a main memory.

Figure 5:
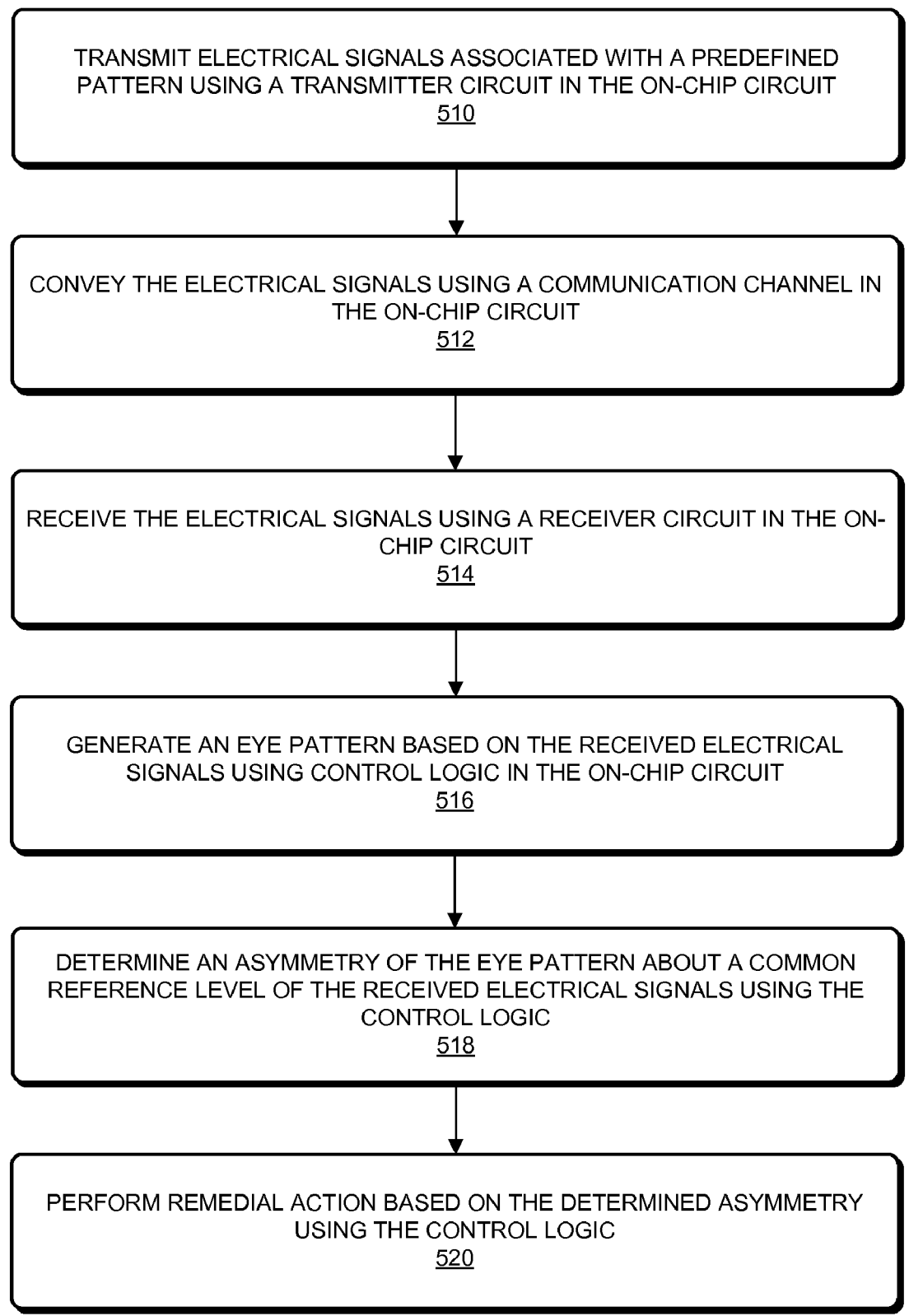
FIG. 5 is a flow chart illustrating a method for assessing an on-chip circuit during an asymmetry testing mode in accordance with an embodiment of the present disclosure.

We now describe embodiments of the method. FIG. 5 presents a flow chart illustrating a method 500 for assessing an on-chip circuit (such as on-chip circuit 100 in FIG. 1A, on-chip circuit 150 in FIG. 1B or on-chip circuit 400 in FIG. 4) during an asymmetry testing mode. During this method, a transmitter circuit in the circuit transmits electrical signals associated with a predefined data pattern (operation 510). Then, a communication channel in the circuit conveys the electrical signals (operation 512). Moreover, a receiver circuit in the circuit receives the electrical signals (operation 514). Next, control logic in the circuit: generates an eye pattern based on the received electrical signals (operation 516); determines an asymmetry of the eye pattern about a common reference level of the received electrical signals (operation 518), and performs remedial action based on the determined asymmetry (operation 520).

In some embodiments of process 500, there are additional or fewer operations. Moreover, the order of the operations may be changed, and/or two or more operations may be combined into a single operation.

Figure 6:
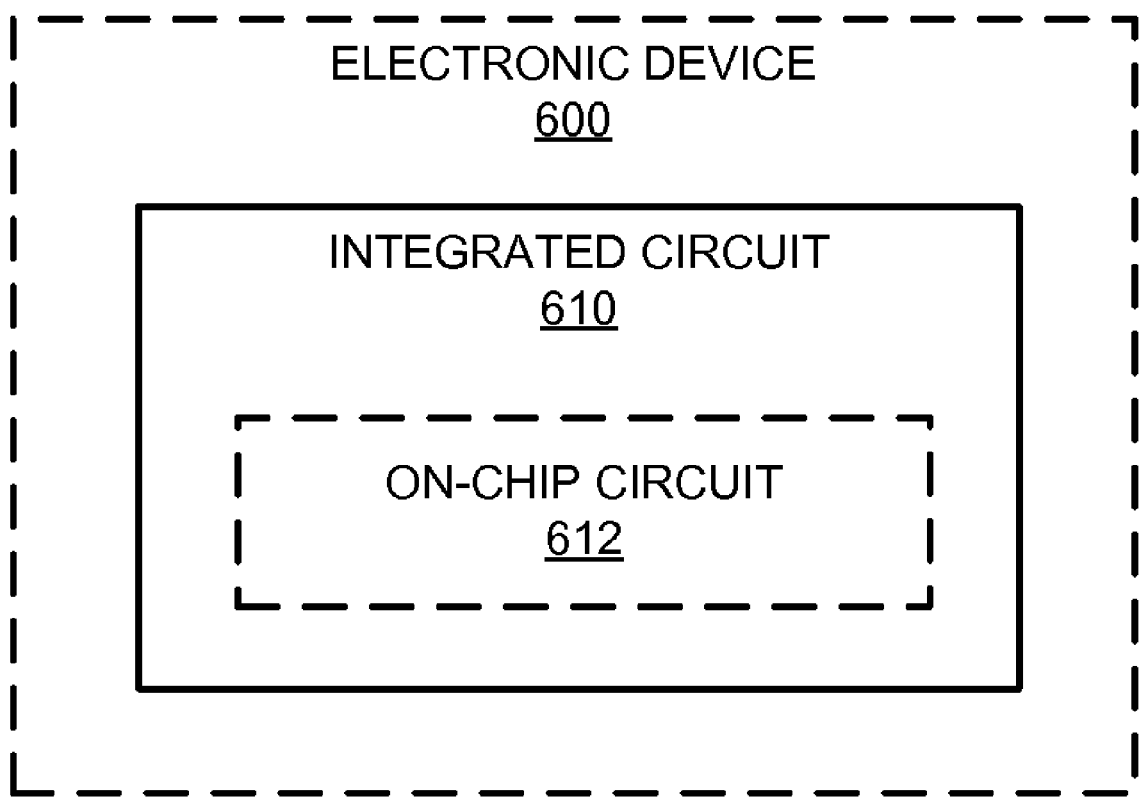
FIG. 6 is a block diagram illustrating an electronic device that includes the on-chip circuit of FIG. 1A, 1B or 4 in accordance with an embodiment of the present disclosure.

In some embodiments, an integrated circuit that includes the on-chip circuit is included in an electronic device (and, more generally, a system). This is shown in FIG. 6, which presents a block diagram illustrating an electronic device 600 that includes on-chip circuit 612, such as on-chip circuit 100 (FIG. 1A), 150 (FIG. 1B) or 400 (FIG. 4). Because on-chip circuit 612 includes the functionality associated with the previously described asymmetry testing technique, it may be used to test the asymmetry of integrated circuit 610 after assembly of electronic device 600. Therefore, the asymmetry testing technique can be used to test the impact of connection resistances (such as board connections or connectors) in electronic device 600. Furthermore, using the determined asymmetry, mismatches in a differential pair may be assessed at the system level, which offers improved screening and reliability of systems such as electronic device 600.

The preceding embodiments of the on-chip circuit may used in a variety of applications, including: VLSI circuits, communication systems (such as a 10 Gbps serial link, Ethernet, PCI express, etc.), storage area networks, memory (for example, in a processor-to-memory link), data centers, networks (such as local area networks), and/or computer systems (such as multiple-core processor computer systems). For example, embodiments of the on-chip circuit may be used in: a high-speed serial link in a processor (such as a 16 Gbps serial link, a coherence link, etc.), an embedded processor, a memory controller (including buffer-onboard application-specific integrated circuits), and/or a switch chip. Furthermore, the computer systems may include, but are not limited to: a server (such as a multi-socket, multi-rack server), a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Note that a given computer system may be at one location or may be distributed over multiple, geographically dispersed locations.

Furthermore, the preceding embodiments may include fewer components or additional components. For example, the functionality in the asymmetry testing technique may be implemented completely on-chip, or at least a portion of the operations may be performed by the external device (such as post processing of the determined asymmetry). Moreover, while the preceding embodiments illustrated the asymmetry testing technique during the asymmetry testing mode, in other embodiments the asymmetry is determined during normal operation of the transmitter circuit, the communication channel and the receiver circuit. Additionally, while the remedial action was described as being based on the determined asymmetry, one or more other criteria may supplement or replace the asymmetry, such as: a voltage margin, a timing margin, a mean-square error, a bit-error rate, jitter, etc. Note that the eye pattern may be generated based on received electrical signals before or after an equalizer in an instance of the receiver circuit (such as a finite-impulse response filter or an infinite-impulse-response filter). In some embodiments, the asymmetry testing technique is implemented using on-chip circuits in two or more integrated circuits. Therefore, this asymmetry testing technique may be used to test inter-chip and/or intra-chip interconnects.

Although these embodiments are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed.

Furthermore, note that circuits in these embodiments may be implemented using bipolar, PMOS and/or NMOS transistors, and signals in different portions of these circuits may include digital signals that have approximately discrete values and/or analog signals that have continuous values (i.e., the circuits may be implemented in the analog and/or digital domain). In addition, as noted previously, functionality in the on-chip circuit may be implemented more in hardware and less in software, or less in hardware and more in software, as is known in the art. In some embodiments, some or all of the functionality of the on-chip circuit is implemented in one or more application-specific integrated circuits (ASICs) and/or one or more digital signal processors (DSPs).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
    a transmitter circuit configured to transmit electrical signals associated with a data pattern;
    a communication channel, electrically coupled to the transmitter circuit, which is configured to convey the electrical signals;
    a receiver circuit, electrically coupled to the communication channel, which is configured to receive the electrical signals; and
    control logic, electrically coupled to the transmitter circuit and the receiver circuit, which is configured to control an asymmetry testing mode in which the data pattern includes a predefined data pattern, wherein, during the asymmetry testing mode, the control logic is configured to:
        generate an eye pattern based on the received electrical signals;
        determine an asymmetry of the eye pattern about a common reference level of the received electrical signals; and
        perform remedial action based on the determined asymmetry.

2. The integrated circuit of claim 1, wherein performing the remedial action involves:
    assessing the circuit by comparing the determined asymmetry with a predefined asymmetry criterion; and
    outputting a result of the assessment to an external device.

3. The integrated circuit of claim 2, wherein, if the asymmetry exceeds the predefined asymmetry criterion, the result indicates that the circuit fails an asymmetry test.

4. The integrated circuit of claim 1, wherein performing the remedial action involves outputting a specifier for the determined asymmetry to an external device.

5. The integrated circuit of claim 4, wherein performing the remedial action further involves outputting the generated eye pattern to the external device.

6. The integrated circuit of claim 1, wherein the communication channel includes a differential pair of signal lines, the receiver circuit includes a differential receiver and the asymmetry is associated with termination impedances of the communication channel.

7. The integrated circuit of claim 6, wherein the termination impedances include a first termination impedance and a second termination impedance, which is in parallel with the first termination impedance; and
    wherein the asymmetry is associated with a difference between the first termination impedance and the second termination impedance.

8. The integrated circuit of claim 1, wherein the transmitter circuit includes multiple transmitter circuit instances, wherein the receiver circuit includes multiple receiver circuit instances, and wherein the integrated circuit further comprises a multiplexer configured to selectively couple the control logic to the multiple transmitter circuit instances and the multiple receiver circuit instances.

9. The integrated circuit of claim 8, further comprising multiple instances of the transmitter circuit, the communication channel and the receiver circuit, wherein the control logic is configured to:

provide signals to the multiplexer to selectively couple the control logic to the multiple instances of the transmitter circuit and the receiver circuit;

generate eye patterns based on received electrical signals from the multiple instances of the receiver circuit;

determine asymmetries of the eye patterns about common reference levels of the associated received electrical signals; and perform the remedial action based on the determined asymmetries.

10. The integrated circuit of claim 9, wherein determining the asymmetries involves statistical analysis of the eye patterns.

11. An electronic device, comprising an integrated circuit that includes:
a transmitter circuit configured to transmit electrical signals associated with a data pattern;
a communication channel, electrically coupled to the transmitter circuit, which is configured to convey the electrical signals;
a receiver circuit, electrically coupled to the communication channel, which is configured to receive the electrical signals;
a processor electrically coupled to the transmitter circuit and the receiver circuit;
memory electrically coupled to the processor; and
a program module, wherein the program module is stored in the memory and configurable to be executed by the processor, the program module including:
instructions for controlling an asymmetry testing mode in which the data pattern includes a predefined data pattern;
instructions for generating an eye pattern based on the received electrical signals during the asymmetry testing mode;
instructions for determining an asymmetry of the eye pattern about a common reference level of the received electrical signals during the asymmetry testing mode; and
instructions for performing remedial action based on the determined asymmetry during the asymmetry testing mode.

12. The electronic device of claim 11, wherein performing the remedial action involves:
assessing the circuit by comparing the determined asymmetry with a predefined asymmetry criterion; and
outputting a result of the assessment to an external device.

13. The electronic device of claim 12, wherein, if the asymmetry exceeds the predefined asymmetry criterion, the result indicates that the circuit fails an asymmetry test.

14. The electronic device of claim 11, wherein performing the remedial action involves outputting a specifier for the determined asymmetry to an external device.

15. The electronic device of claim 14, wherein performing the remedial action further involves outputting the generated eye pattern to the external device.

16. The electronic device of claim 11, wherein the communication channel includes a differential pair of signal lines, the receiver circuit includes a differential receiver and the asymmetry is associated with termination impedances of the communication channel.

17. The electronic device of claim 16, wherein the termination impedances include a first termination impedance and a second termination impedance, which is in parallel with the first termination impedance; and
wherein the asymmetry is associated with a difference between the first termination impedance and the second termination impedance.

18. The electronic device of claim 11, wherein the transmitter circuit includes multiple transmitter circuit instances, wherein the receiver circuit includes multiple receiver circuit instances, and wherein the electronic device further comprises a multiplexer configured to selectively couple the control logic to the multiple transmitter circuit instances and the multiple receiver circuit instances.

19. The electronic device of claim 18, further comprising multiple instances of the transmitter circuit, the communication channel and the receiver circuit, wherein the control logic is configured to:
provide signals to the multiplexer to selectively couple the processor to the multiple instances of the transmitter circuit and the receiver circuit;
generate eye patterns based on received electrical signals from the multiple instances of the receiver circuit;
determine asymmetries of the eye patterns about common reference levels of the associated received electrical signals; and
perform the remedial action based on the determined asymmetries.

20. A method for assessing an on-chip circuit during an asymmetry testing mode, comprising:
using a transmitter circuit in the circuit, transmitting electrical signals associated with a predefined data pattern;
conveying the electrical signals in a communication channel in the circuit;
using a receiver circuit in the circuit to receive the electrical signals; and
using control logic in the circuit to:
generate an eye pattern based on the received electrical signals;
determine an asymmetry of the eye pattern about a common reference level of the received electrical signals, and
perform remedial action based on the determined asymmetry.

* * * * *